US007907260B2

(12) United States Patent
Venugopal et al.

(10) Patent No.: US 7,907,260 B2

(45) Date of Patent: Mar. 15, 2011

(54) COLLIMATOR ARRANGEMENTS INCLUDING MULTIPLE COLLIMATORS AND IMPLEMENTATION METHODS THEREOF

(75) Inventors: Vijayakumar C. Venugopal, Berkeley, CA (US); Eric A. Pape, Newark, CA (US)

(73) Assignee: Lam Research Corporation, Fremont, CA (US)

( * ) Notice: Subject to any disclaimer, the term of this patent is extended or adjusted under 35 U.S.C. 154(b) by 928 days.

(21) Appl. No.: 11/772,008

(22) Filed: Jun. 29, 2007

(65) Prior Publication Data

US 2009/0002836 A1 Jan. 1, 2009

(51) Int. Cl.
*G01N 21/00* (2006.01)
*G02B 27/30* (2006.01)

(52) U.S. Cl. .......................................... 356/72; 359/641

(58) Field of Classification Search .................... 356/72; 359/641

See application file for complete search history.

(56) References Cited

U.S. PATENT DOCUMENTS 4,541,718 A * 9/1985 Osada et al. .................. 356/316
6,455,437 B1 9/2002 Davidow et al.
2003/0090676 A1 5/2003 Goebel et al.
2005/0020073 A1 1/2005 Perry

OTHER PUBLICATIONS

"International Search Report", Issued in PCT Application No. PCT/US2008/066706; Mailing Date: Dec. 29, 2008.
"Written Opinion", Issued in PCT Application No. PCT/US2008/066706; Mailing Date: Dec. 29, 2008.
"International Prelirninany Report on Patentability", Issued in PCT Application No. PCT/US2008/066706; Mailing Date: Jan. 14, 2010.

* cited by examiner

*Primary Examiner* — F. L Evans

(74) *Attorney, Agent, or Firm* — IP Strategy Group, P.C.

(57) ABSTRACT

A method for optical interrogation of plasma during plasma processing in a plasma processing chamber is provided. The method includes providing an optical viewport. The method also includes providing a collimator arrangement. The collimator arrangement is configured with a plurality of collimators, wherein a first collimator of the plurality of collimators is separated by a connecting region from a second collimator in the plurality of collimators. The method further includes collecting optical signals, through the collimator arrangement, from the plasma within the plasma processing chamber while a substrate is being processed, resulting in highly collimated optical signals.

35 Claims, 14 Drawing Sheets

COLLIMATOR ARRANGEMENTS INCLUDING MULTIPLE COLLIMATORS AND IMPLEMENTATION METHODS THEREOF

BACKGROUND OF THE INVENTION

Advances in plasma processing have facilitated growth in the semiconductor industry. During plasma processing, diagnostic tools may be employed to ensure high yield of devices being processed. Optical emission spectroscopy (OES) is often utilized as a diagnostic tool for gas-phase monitoring of etchants and etched products to maintain tight control of process parameters.

In the optical interrogation of plasma, there is a characteristic glow, i.e., specific optical emission spectrum, associated with a plasma discharge. With spectral information from the optical interrogation, a considerable amount of information on constituent species may be collected and analyzed to provide guidance for process monitoring and control during plasma processing.

To facilitate discussion, FIG. 1A shows a simplified schematic of a prior art plasma processing chamber 100 with an optical viewport, i.e., window, 102 that has a direct line of sight to plasma 104. As the term is employed herein, a line of sight is an optical straight-line path from a source to a collector without any form of obstruction.

Consider the situation wherein, for example, optical interrogation of plasma 104 is being performed. Due to the optical path length, the line of sight may have some arbitrary angle of acceptance at optical viewport 102. As the term is employed herein, angle of acceptance is an angle from the distal end of viewport 102 which a non-axial light source may still reach the collector end of optical viewport 102.

In an example, to perform endpoint detection via optical interrogation, it may be desirable to collect a signal source from a specific area of plasma 104 with a particular line of sight at viewport 102. The area outside of the angle of acceptance may include diffraction and/or reflection of light from other surfaces in plasma processing chamber 100. Thus, a low angle of acceptance may be highly desired for optical interrogation of the specific area of plasma 104. However, the simple setup of viewport 102 in the example of FIG. 1A may lend itself to a larger angle of acceptance.

In order to examine the spectra emission of the plasma, optical viewport 102 may be required to be optically transparent to the measured wavelength(s). For infrared (IR) to ultraviolet (UV) wavelengths, optical viewport 102 may be constructed from some type of fused silica, e.g. semiconductor grade or UV optical grade. One of the issues with placing the optically transparent viewport within a region close to the plasma is the potential to get deposition or etching on optical viewport 102 over time.

In general, optically transparent windows may be clouded or be eroded during plasma processing. When optical signal degradation from these causes reaches a level that impacts system performance, equipment must be removed from service to regain initial functionality. System downtime increases maintenance costs (removal of parts, cleaning or replacement, reinstallation) and reduces overall production output.

Consider the situation wherein, for example, a fabrication process is fine-timed to a particular set of quantitative values from a baseline process at time zero using optical interrogation. During plasma processing, the fabrication process compares experimental values with baseline values to deliver optimal yield. However, if optical viewport 102 has been compromised by deposition or etching over time, the fabrication process may not be able to determine if the drift in transmission of signal intensity is due to the change in plasma properties or due to viewport 102 being conditioned.

Furthermore, the change in transmission of signal intensity may be wavelength dependent. For example, the signal intensity of UV to IR spectrum is being examined for the plasma process. At time zero, the UV to IR spectrum may transmit at 100 percent. However, at time X UV wavelengths may transmit at 50 percent and IR wavelengths may transmit at 90 percent. Thus, it may be difficult to quantitatively separate changes in the plasma spectral signal from changes in window transmittance over some finite time period.

FIG. 1B shows a simplified schematic of a prior art solution employing a collimator 128 in a plasma processing chamber 120. In the example of FIG. 1B, collimator 128 is coupled to an optical viewport 122 with a direct line of sight to plasma 124. In an example, collimator 128 has an arbitrary length (L) and diameter (D). The dimensionless ratio of L over D, i.e., (L/D), is the aspect ratio.

By employing collimator 128, the example of FIG. 1B may have been able to address some of the issues of viewport conditioning and/or angle of acceptance of non-axial light. For example, the higher the aspect ratio (L/D) of the collimator the larger the value of L is compared to D. In the case of angle of acceptance, the amount of non-axial light reaching the collector end of collimator 128 is minimized as the aspect ratio increases. Analogously, due to molecular diffusivity, the quantity of materials from reaction chamber reaching optical viewport 122 is also minimized. Therefore, a collimator with high aspect ratio is very desirable due to the aforementioned benefits.

FIG. 1C shows a simplified schematic of a prior art solution with a long collimator, 148, in a plasma processing chamber 140. In the example of FIG. 1C, collimator 148 is coupled to an optical viewport 142 with a direct line of sight to plasma 144. In an example, collimator 148 has a length (L) and diameter (D). To attain a high aspect ratio, the value of L is larger than the value of D in the example of FIG. 1C.

In order to minimize deposition or etching on viewport 142, an aspect ratio of greater than 10:1 is often needed. Analogously, in order to get to a small angle of acceptance, e.g., less than 2° line of sight for suitable optic coupling, an aspect ratio upward of about 30:1 is desired. Consider the situation wherein, for example, collimator 148 has a diameter (D) of about 1 inch. To minimize viewport conditioning and/or achieve small angle of acceptance, collimator 148 may need to be 30 inches in length (L) to attain an approximately 2° acceptance angle. However, a collimator of 30" in length is not, at this time, a practical solution for plasma processing equipment.

FIG. 2A shows a simplified schematic of a prior art solution of a collimator 228 with a single, small diameter hole in a plasma processing chamber 220. In the example of FIG. 2A, collimator 228 is coupled to an optical viewport 222 with a direct line of sight to plasma 224.

To create a compact collimator with high aspect ratio, the diameter of the hole in the collimator may be reduced. For example, collimator 228 is a solid tube with a hole 230 of diameter with a first pre-determined value bored through the length of the tube. The diameter of the hole with the first pre-determined value for collimator 228 of FIG. 2A is smaller than the diameter of the hole with a second pre-determined value for collimator 148 of FIG. 1B.

To reduce the length of the collimator aid still maintain a high aspect ratio, a collimator may have a hole of diameter that is 1/10 of the size of 1 inch for example. The length of collimator 228 would therefore be 1/10 of the collimator length required for a hole diameter of 1" to obtain a specified aspect ratio. However, a collimator with a very small diameter hole may not be practical since the amount of light being collected is minimal. Therefore, the ability to use most spectrophotometers to process the signal is impractical due to unreasonable integration time and/or high signal to noise ratio.

FIG. 28 shows a simplified schematic of a multi-holed collimator in plasma processing chamber 240. In the example of FIG. 2A, collimator 248 is coupled to an optical viewport 242 with a direct line of sight to plasma 244. Collimator 248 is a solid tube with a plurality of holes (250A . . . 250N) of diameter (D) bored through the length of the tube.

Collimator 248 of FIG. 2B may be configured with a full array of holes to collect upwards of 60% of light incident to the whole area of the distal end of collimator 248. From the manufacturability standpoint, collimator setup of FIG. 2B may be easily machineable to an aspect ratio of about 10:1. However, beyond the 10:1 aspect ratio it may become very difficult and expensive to machine holes that retain a good degree of perpendicularity to the collection area. Although an aspect ratio of 10:1 may reduce optical viewport 242 conditioning, a higher aspect ratio, i.e., 30:1, is required to attain a small angle of acceptance for direct line of sight to minimize non-axial light collection.

Unfortunately, the aforementioned prior art collimators may not provide the optimal solution to optical interrogation of plasma employing optical emission spectroscopy, laser induced fluorescence, particle detection, optical absorption spectroscopy, or other optical interrogation methods used in semiconductor processing environments. To overcome the problems of deposition or etching on optical viewport and/or high angle of acceptance, collimators with high aspect ratio are desirable. To attain the required high aspect ratio, prior art solutions may not be practical, too expensive, or outside current machining capability.

SUMMARY OF INVENTION

The invention relates, in an embodiment, a method for optical interrogation of plasma during plasma processing in a plasma processing chamber. The method includes providing an optical viewport. The method also includes providing a collimator arrangement. The collimator arrangement is configured with a plurality of collimators, wherein a first collimator of the plurality of collimators is separated by a connecting region from a second collimator in the plurality of collimators. The method further includes collecting optical signals, through the collimator arrangement, from the plasma within the plasma processing chamber while a substrate is being processed, resulting in highly collimated optical signals.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
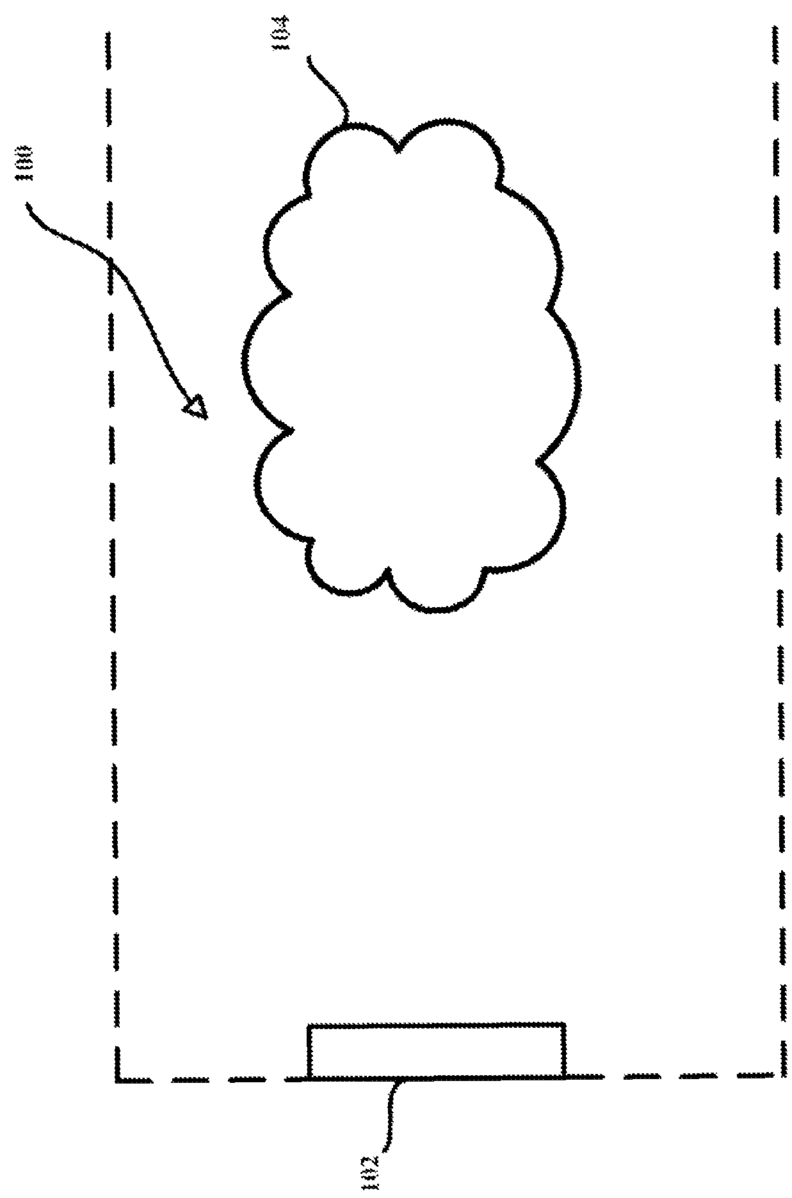
FIG. 1A shows a simplified schematic of a prior art plasma processing chamber with an optical viewport, i.e., window, that has a direct line of sight to plasma.
Figure 1B:
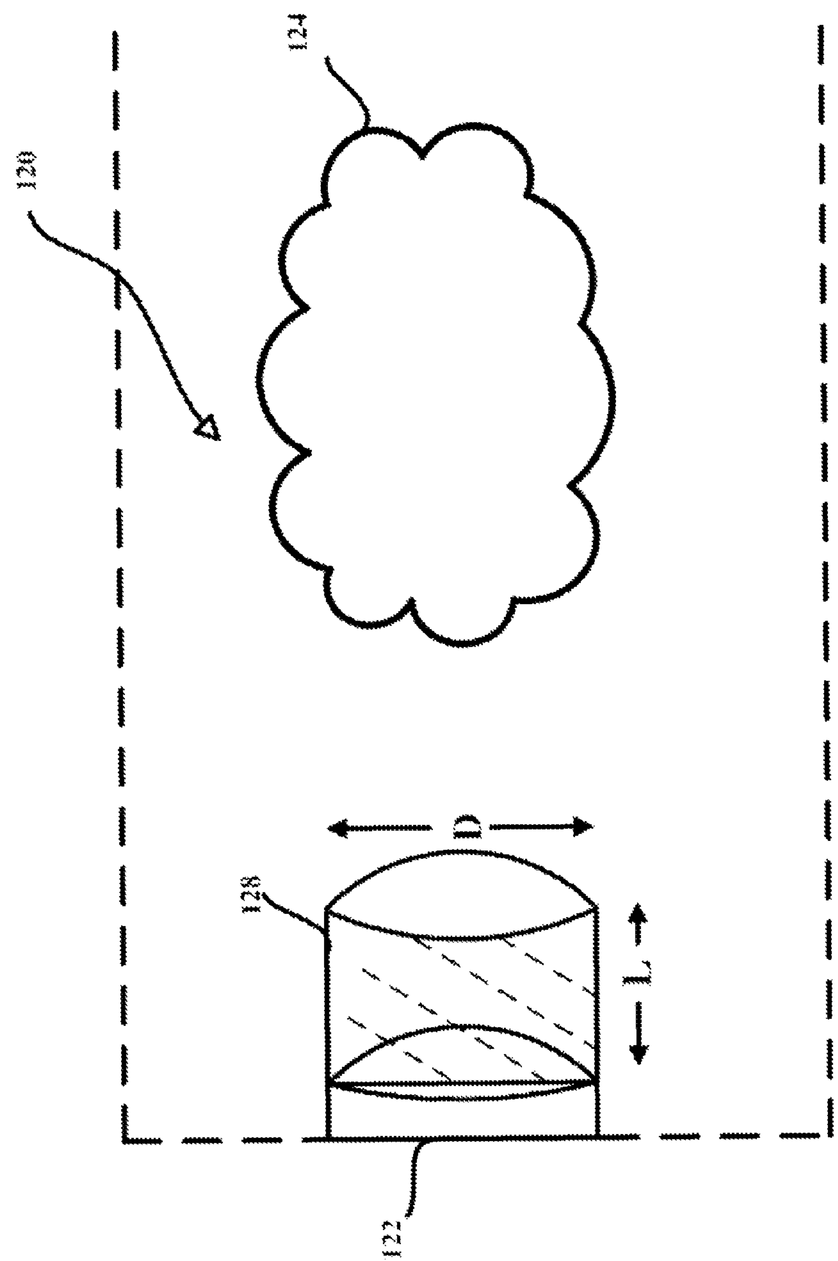
FIG. 1B shows a simplified schematic of a prior art solution employing a collimator in a plasma processing chamber.
Figure 1C:
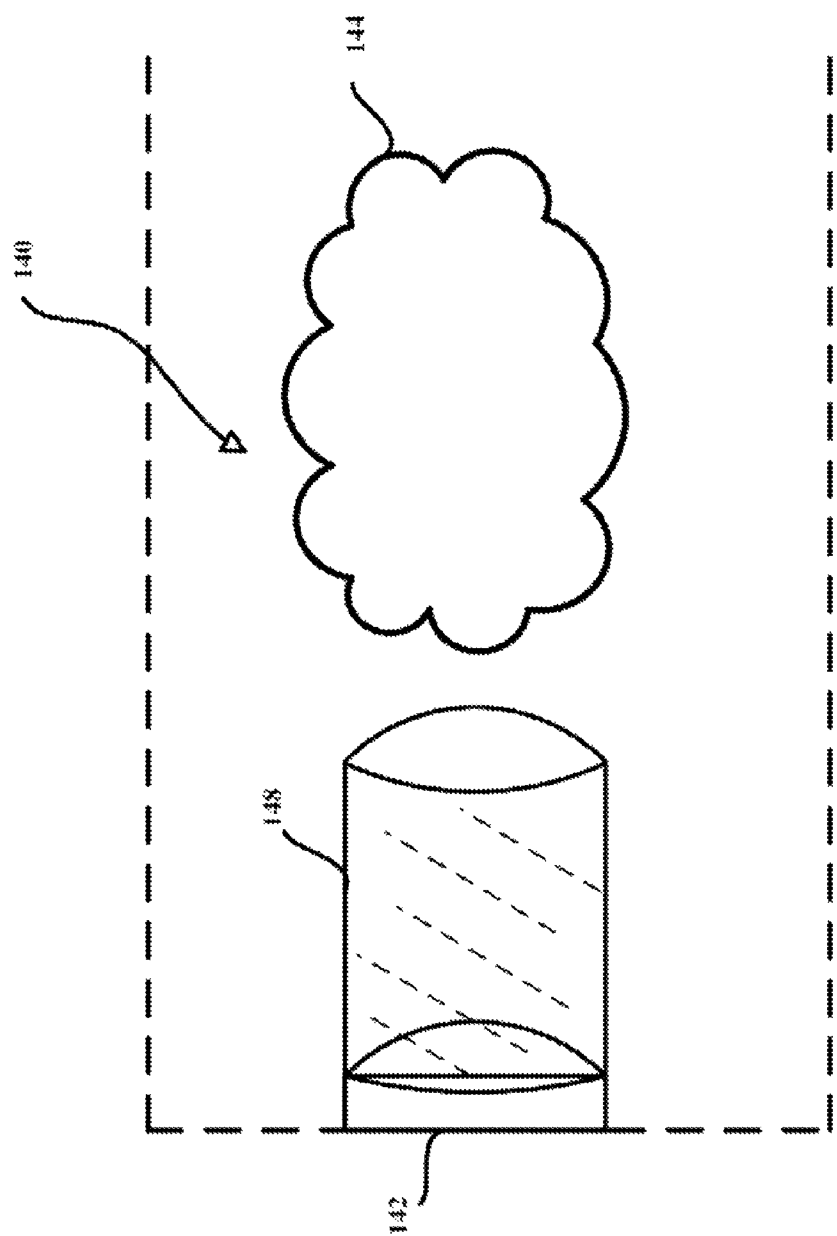
FIG. 1C shows a simplified schematic of a prior art solution with a long collimator in a plasma processing chamber.
Figure 2A:
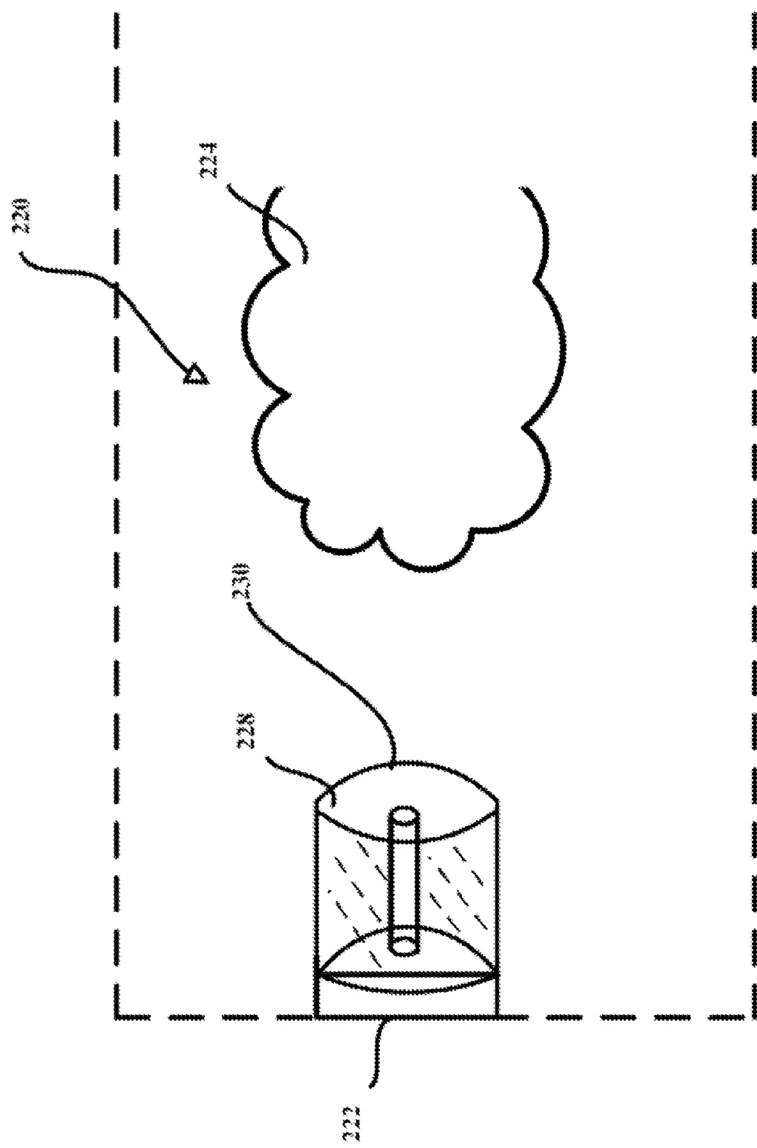
FIG. 2A shows a simplified schematic of a prior art solution of a collimator with a single, small diameter hole in a plasma processing chamber.
Figure 2B:
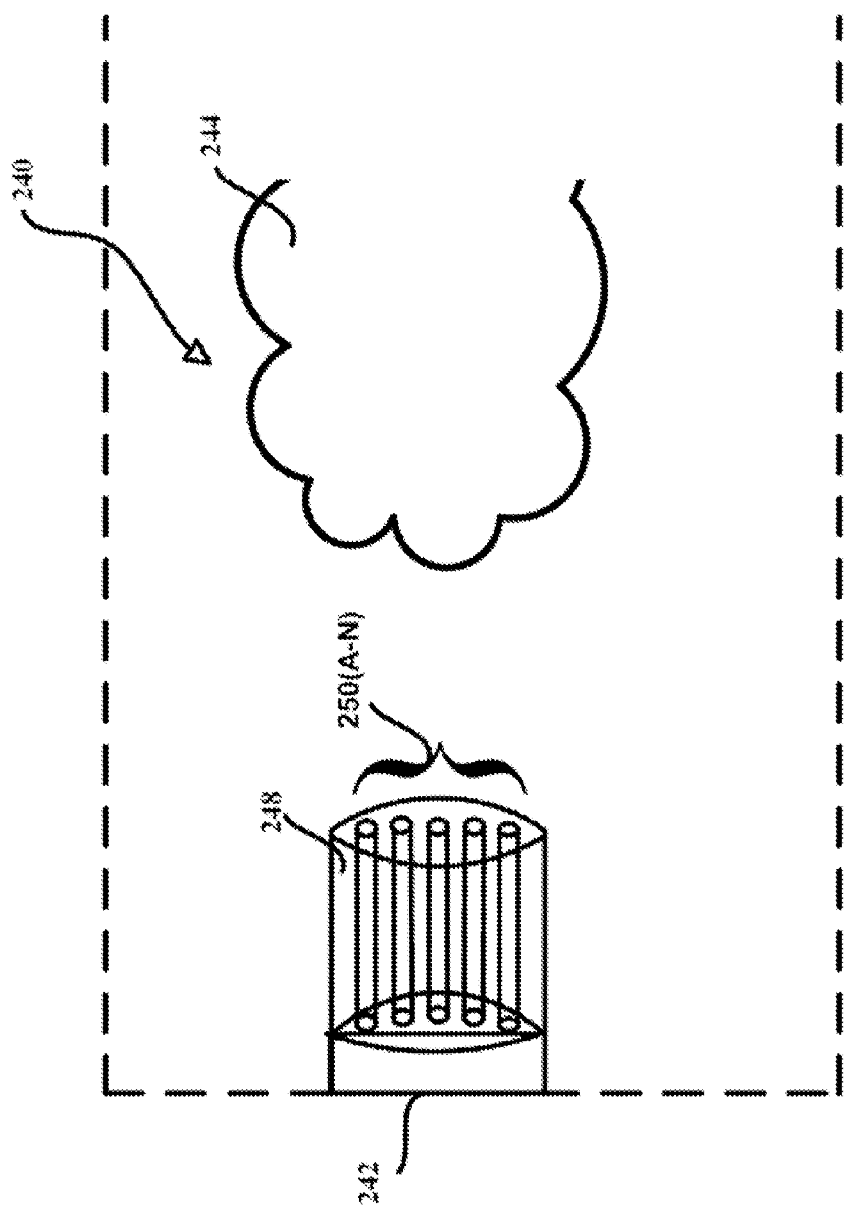
FIG. 2B shows a simplified schematic of a multi-holed collimator in plasma processing chamber.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure tire present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semi conductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the invention, there are provided methods and arrangements to improve the efficiency of a diagnostic tool to perform optical interrogation of plasma during plasma processing. Embodiments of the invention include employing a collimator arrangement with a plurality of collimators to attain higher effective aspect ratio. By attaining higher effective aspect ratio, collimator arrangement may protect a viewport from being conditioned by plasma species while reducing the amount of off-axis light that reaches an external signal measurement device.

In an embodiment, the collimator arrangement may be configured to have two collimators separated by a connecting region. In another embodiment, each collimator may be independently machined to attain tire highest cost efficiency and/or commercially feasible aspect ratio. By providing independently machinable collimators and/or connecting region, the collimator arrangement may be able to achieve an increase effective aspect ratio beyond the simple arithmetic sum of the aspect ratios of each collimator.

In an embodiment, the collimator arrangement may be machined from a single unit. In an embodiment, the collimator arrangement may be constructed from multiple components. Thus, collimator arrangement may be manufactured by a plurality of methods to achieve similar results.

In assembling a multi-component collimator arrangement, alignment between a plurality of collimators may be critical in achieving highest optical signal intensity collection. In an example, the collimator arrangement may be configured, with keying features on each collimator and/or on the collimator external housing in an embodiment. In an embodiment, a collimator in a multi components collimator arrangement may be configured with a movement stage to allow for translational, rotational and/or gimballing motion. By having keying features and/or movement stage, alignment of collimators may be performed as necessary for optimum performance.

In an embodiment, each collimator may be independently configured to have holes of different diameters, lengths, shapes, tapering functions, placements, population densities, and/or diameter distributions. By having these permutations of options for each collimator, the collimator arrangement may be optimized to attain the desired optical collection efficiency.

Figure 3A:
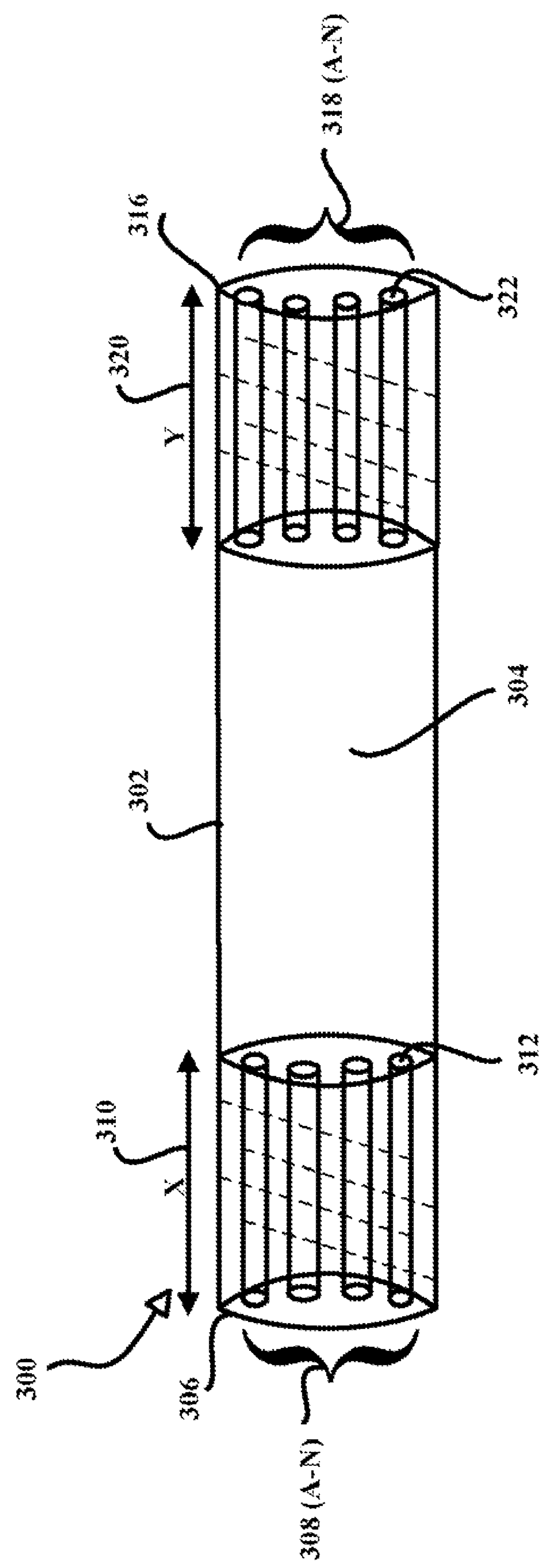
FIG. 3A shows, in accordance with an embodiment of the present invention, a simplified schematic of a collimator arrangement with two collimators.

The features and advantages of the invention may be better understood with reference to the figures and discussions that follow. FIG. 3A shows, in accordance with an embodiment of the present invention, a simplified schematic of a collimator arrangement 300 with two collimators.

In an embodiment, collimator arrangement 300 may be configured to have two collimators, a first collimator 306 and a second collimator 316, separated by a void area 304. Void area 304 may be configured to have a shell 302 around void area 304 to retain both separation and/or alignment between first collimator 306 and second collimator 316.

In another embodiment, collimator arrangement 300 may be configured such that each of the collimators, first collimator 306 and/or second collimator 316, are independent in term of the number of holes, spatial array, diameter of each hole, length of collimator, and such. The independent features of each collimator may provide for flexibility in design and/or customization of collimator arrangement 300 to tailor to specific application needs.

In an example, first collimator 306 may have a first pre-determined length 310, an array of a first pre-determined number of holes 308, and a first pre-determined diameter 312 for each hole. Similarly, second collimator 316 may also have a second pre-determined length 320, an array of a second pre-determined number of holes 308, and a second pre-determined diameter 322 for each hole. Hence, each collimator may be machined independently to the highest aspect ratio feasible, e.g. both in terms of economic and manufacturing constraints.

Since machining capability may be the limiting economic factor to manufacture collimators with a high aspect ratio, the ability to machine each collimator separately to the limit attainable by state-of the-art process allows for the total increase in aspect ratio. The increase in effective aspect ratio is beyond the arithmetic sum of the aspect ratios of each collimator. However, the total length of collimator arrangement 300 may place an upper limit on the effective aspect ratio.

As shown in FIG. 3A, the effective aspect ratio of collimator arrangement 300 may be between the sum of the aspect ratios of the collimators and the aspect ratio determines by the total length of collimator arrangement 300. Consider the situation wherein, for example, each collimator may be machined to the commercially feasible machining capability, e.g., an aspect ratio of 10; 1. In an example, the total length of collimator arrangement 300 may have a total aspect ratio of 30:1. Hie effective collimator aspect ratio may be between 20:1 to 30:1. Hence, void area 304 advantageously increases the total length of collimator arrangement 300 to increase the effective aspect ratio.

In contrast to prior art, collimator arrangement 300 may achieve very high effective aspect ratio, i.e., greater than 30:1, without incurring exorbitant manufacturing cost and/or impractical collimator length. By achieving high effective aspect ratio, collimator arrangement 300 may protect a viewport from being conditioned by plasma species while attaining low angle of acceptance for line of sight.

Figure 3B:
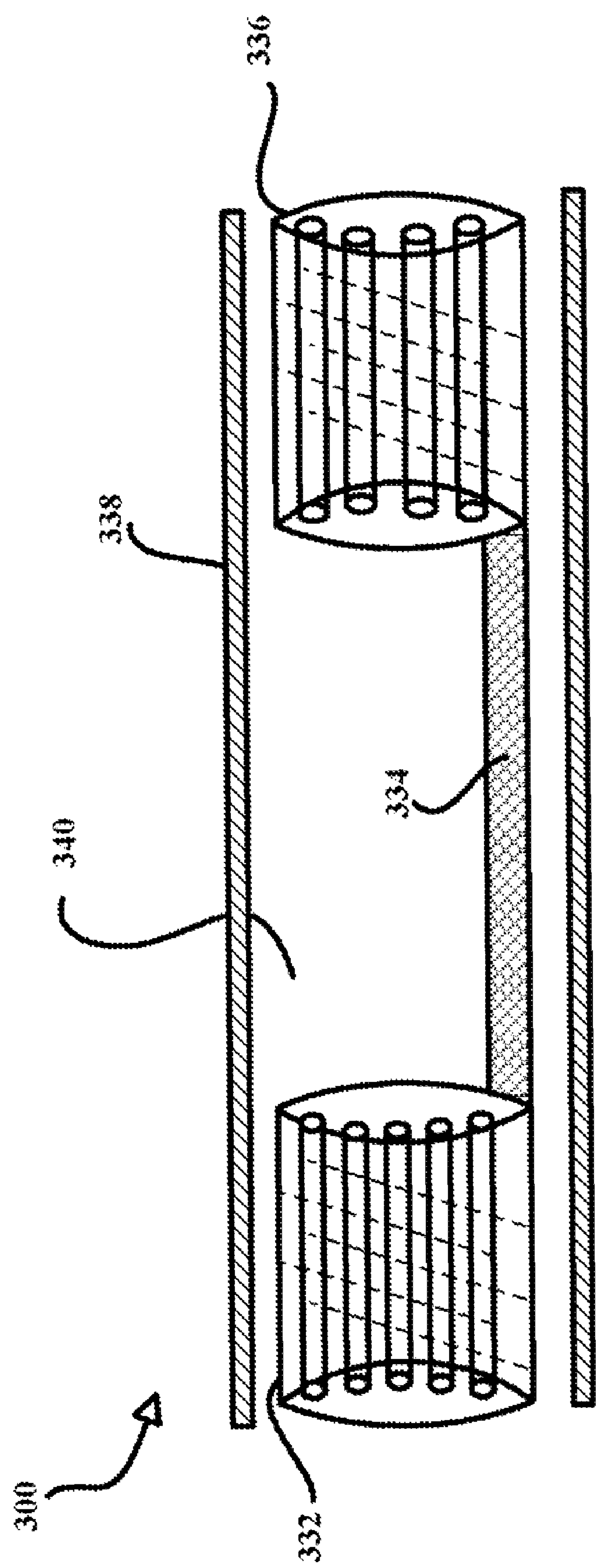
FIG. 3B, in accordance with an embodiment of the invention, shows a simplified schematic of a monolithic collimator arrangement.

FIG. 3B, in accordance with an embodiment of the invention, shows a simplified schematic of a monolithic collimator arrangement 330. As shown in FIG. 3B, monolithic collimator arrangement 330 may be configured with a first collimator 332 and a second collimator 336 at each end from a single piece of material. First collimator 332 and second collimator 334 are separated by a connecting region 334. Collimator arrangement 330 may be fitted into an external housing 338 to prevent plasma species or unwanted light source from direct access of connecting region 334 machined out between the two collimated pieces.

In the implementation of FIG. 3B, collimator arrangement 330 may be machined from a single unit in an embodiment. First collimator 332 and second collimator 336 may be machined independently in terms of the number of holes, spatial array, diameter of each hole, length of collimator, and such, in accordance with an embodiment. Thus, first collimator 332 and second collimator 336 may be manufactured to a moderate aspect ratio inexpensively from conventionally available tools. Alternatively, each collimator may be machined to attain the highest aspect ratio possible with state-of-the art tools without incurring exorbitant cost. However, by combining first collimator 332 and second collimator 336, collimator arrangement 330 may achieve higher effective aspect ratio than possible by conventional machining of a single collimator.

Initially, collimator arrangement 330 may be a single solid piece of material. As shown in FIG. 3B, first collimator 332 aid second collimator 336 are separated by a connecting region 334. In an embodiment, connecting region 334 may be machined to create a void area 340 that may allow for substantially full transmission of light between first collimator 332 and second collimator 336. An advantage of machining first collimator 332, second collimator 336, and connecting region 334 from a single unit may be the very high control over the alignment between the collimators. In addition, connecting region 334 may serve as a separation for the two collimators and lengthen collimator arrangement 330 to increase the effective aspect ratio. Thus, alignment of the holes between the collimators in combination with high aspect ratio may provide line of sight with a small acceptance angle.

Although collimator arrangement with two collimators have been discussed in the implementation of FIGS. 3A and 3B to illustrate a method for attaining high effective aspect ratio, other arrangements may also be employed that may have a plurality of collimators, e.g. more than 2 collimators. Consider the situation wherein, for example, a user may need a collimator arrangement with a shortened length of the aforementioned void area. Collimator arrangement may be configured to have three or more collimators in the same length of the aforementioned void area. Thus, the length of the void area between each collimator has been effectively reduced without significantly affecting the effective aspect ratio.

Figure 3C:
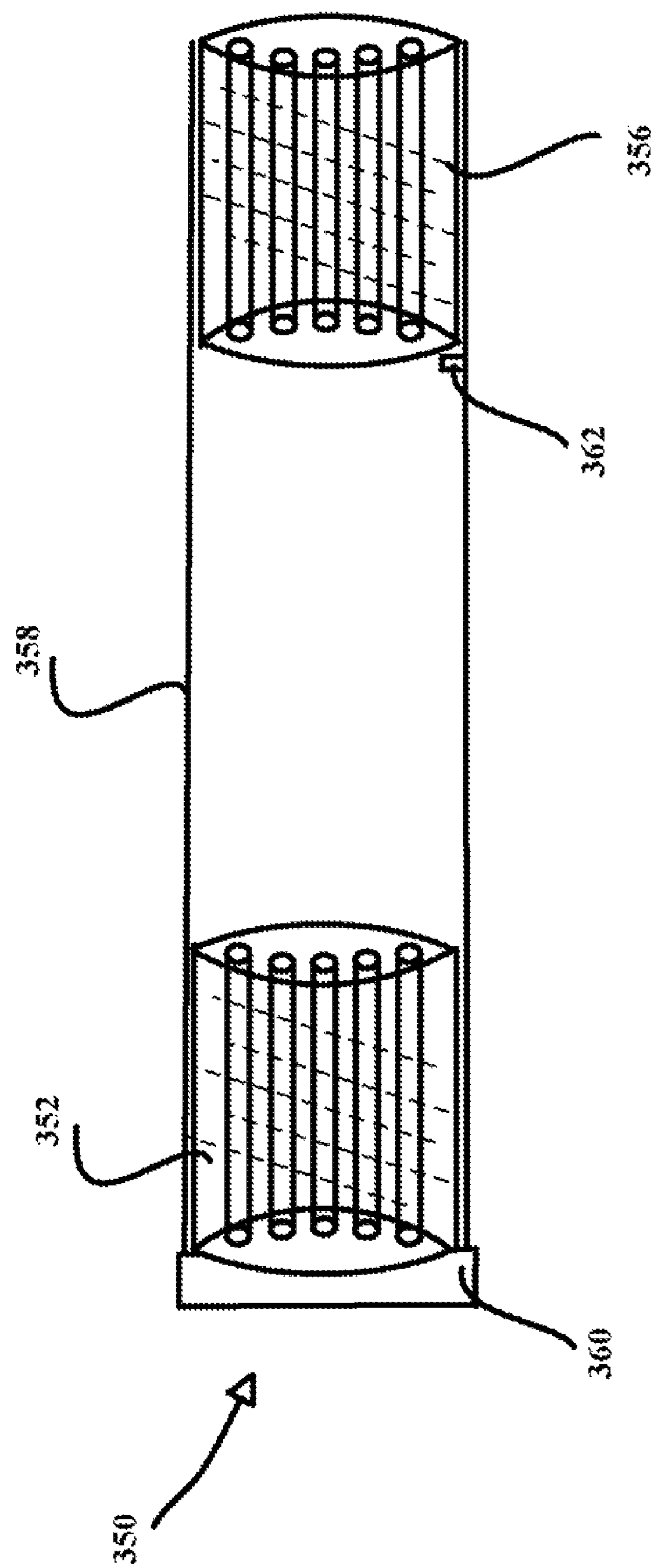
FIG. 3C, in accordance with an embodiment of the invention, shows a simplified schematic of a multi-component collimator arrangement.

FIG. 3C, in accordance with an embodiment of the invention, shows a simplified schematic of a multi-component collimator arrangement 350. As shown in FIG. 3C, multi-component collimator arrangement 350 may be configured with a first collimator 352 and a second collimator 356 to mount into each end of an external housing 358.

As shown in the implementation of FIG. 3C, first collimator 352 and second collimator 356 are separate units. In an embodiment, each collimator may be machined independently in terms of the number of holes, spatial array, diameter of each hole, length of collimator, and such. Thus, each collimator may be machined to the highest attainable aspect ratio at a reasonable cost.

In an embodiment, first collimator 352 and second collimator 356 may be mounted into each end of external housing 358. External housing 358 may be employed to retain separation and/or alignment between the collimators, in an embodiment. As aforementioned, the separation feature external housing 358 may serve to lengthen collimator arrangement 350 to increase the effective aspect ratio.

As shown in FIG. 3C, the alignment of multi-component collimator arrangement 350 may be achieved by a plurality of methods. In accordance with an embodiment of the invention, keying feature(s) may be configured on a collimator to attain alignment. In an example, first collimator 352 may be configured with a first keying feature 360. In an embodiment, first keying feature 360 may be configured at one end of first collimator 352 to serve as a depth key for determining the depth of insertion into external housing 358. Alternatively and/or concurrently, first keying feature 360 may serve as rotational alignment key for first collimator 352, in an embodiment.

In accordance with another embodiment of the invention, keying feature(s) may be configured on external housing 358. For example, a second keying feature 362 may be configured on the inner surface of external housing 358. Similarly, second keying feature 362 may also be employed as an alignment and/or depth keying methods.

Although keying methods have been discussed in the implementation of FIG. 3C to illustrate alignment and/or depth keying methods, other arrangements involving the same and/or different features for alignment and/or depth keying may also be employed.

Figure 4:
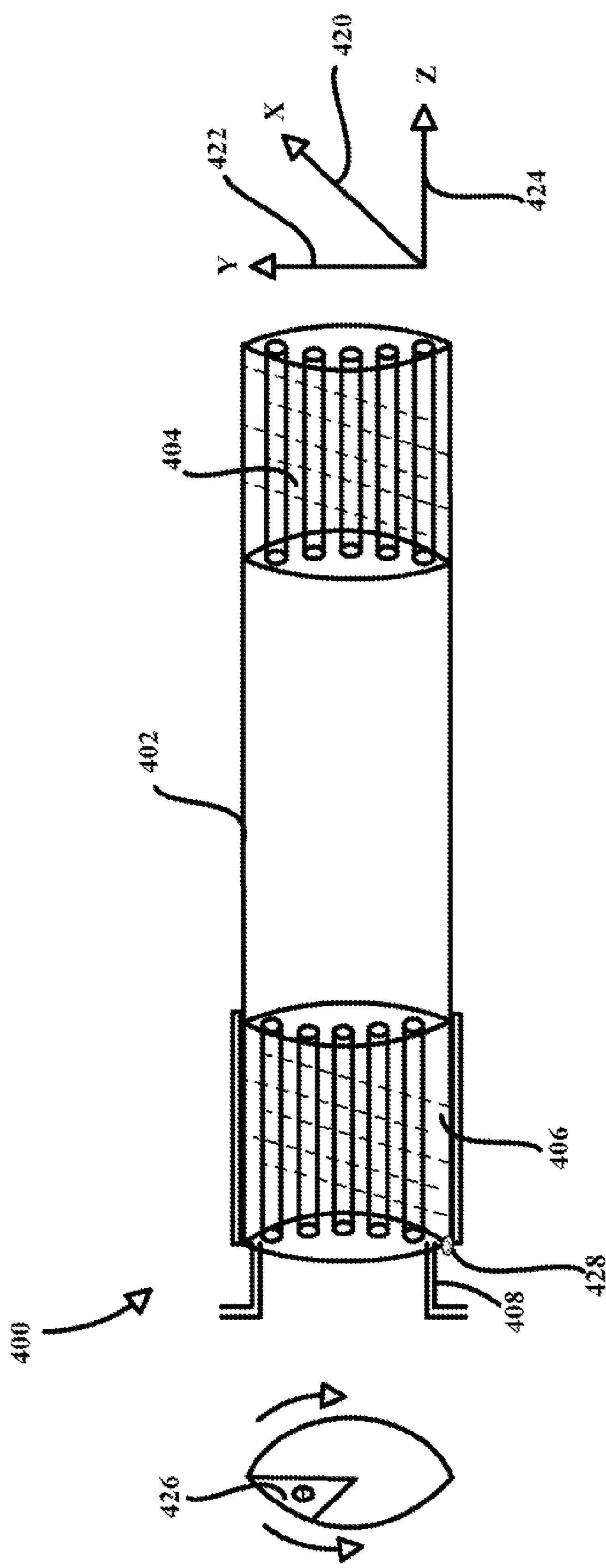
FIG. 4 shows, in accordance with an embodiment of the invention, a simplified schematic of a multi-component collimator arrangement with alignment features.

Generally, in a collimator arrangement that may employ a plurality of collimators, the alignment between the collimators may be critical for optimal signal intensity collection. For many of the optical interrogation techniques, collimated assemblies are required on diametrically opposed sides of a vacuum chamber. As such, macroscopic translational and rotational control of the full collimator assembly is necessary for cross-chamber alignment. FIG. 4 shows, in accordance with an embodiment of the invention, a simplified schematic of a multi-component collimator arrangement (400) with alignment features.

In an example, multi-component collimator arrangement (400) may be configured with a first collimator 404. First collimator 404 may be configured to be fixed in position relative to external housing 402. At the opposite end of external housing 402, a second collimator 406 may be mounted with a movement stage 408 for alignment. Movement stage 408 may be configured to allow second collimator 406 to have translational motion, rotational motion, and/or gimballing motion.

As shown in FIG. 4, translational motions may include movement along x direction 420, y direction 422, and z direction 424. Rotational motion may include clockwise or counter clockwise movement, as defined by an angle θ (426), around external housing 402. Gimballing motion may include tilting of second collimator 406 around an arbitrary point 428 in space. In the implementation of FIG. 4, second collimator 406 may be gimballed in the x direction 420 and/or y direction 422 around point 428. Furthermore, other methods of moving second collimator 406 may be employed to align collimator arrangement 400.

By having the aforementioned alignment capabilities, collimator arrangement 400 may be optimized to attain the highest optical signal intensity collection. For example, z direction 424 translation may be employed to fine tune the length of collimator arrangement 400 for specific effective aspect ratio. The higher effective aspect ratio may translate to smaller acceptance angle for a particular optical path. In another example, rotational motion may be employed to line-tune the alignment of the holes between first collimator 404 and/or second collimator 406. For example, second collimator 406 may be rotated to a specific angle θ (426) to the optimal direct line of sight with the lowest acceptance angle for a particular optical path.

Another factor of concern in alignment of multi-component tubular assembly may be the skew. As the term is employed herein, skew is a slanting of a tubular component from an intended straight line. The skew may be fine-tuned in collimator arrangement 400 by employing the gimballing motion to tilt second collimator 406 around arbitrary point 428 in space in x direction 420 and y direction 424.

Consider the situation wherein, for example, second collimator 406 has been determined to have a skew of 5 millimeters (mm) in the negative x direction 420. Since second collimator 406 may be tilted around arbitrary point 428, collimator 406 may be tilted 5 mm in the positive x direction 420 to compensate for the skew. By employing the gimballing motion, collimator 406 may be fine-tuned to attain the highest linear alignment relative to another component, e.g., first collimator 404.

As illustrated in aforementioned methods, various alignment methods may be employed to attain highest optical signal intensity collection for a multi-component collimator arrangement. In general, other methods for alignments may also be employed to optimize optical intensity collection for collimator arrangement with a plurality of collimators.

Figure 5A:
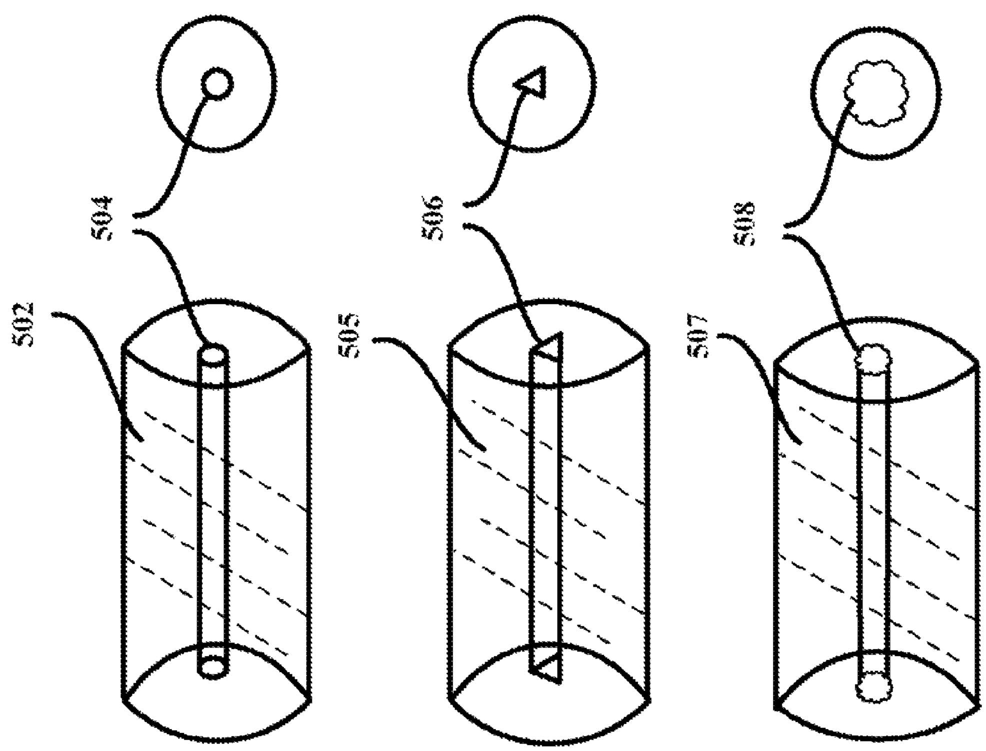
FIG. 5A shows, in accordance with an embodiment of the invention, a simplified schematic of variations on shape of a hole in a collimator.

FIG. 5A shows, in accordance with an embodiment of the invention, a simplified schematic of variations on shape of a hole in a collimator. For example, a collimator 502 shows a typical circular hole 504. Circular hole 504 may be a hole that has been bored straight through a material. However, depending on the need and the available method of boring hole, a hole may take any arbitrary shape. In an embodiment, a collimator 505 shows a hole with an arbitrary polygon shape 506, e.g. a triangle. In another embodiment, a collimator 507 shows a hole with an arbitrary abstract shape 508. Thus, depending on the light collection needs and the available machining technology, a collimator may have hole with any suitable shape to optimize for light collection.

Figure 5B:
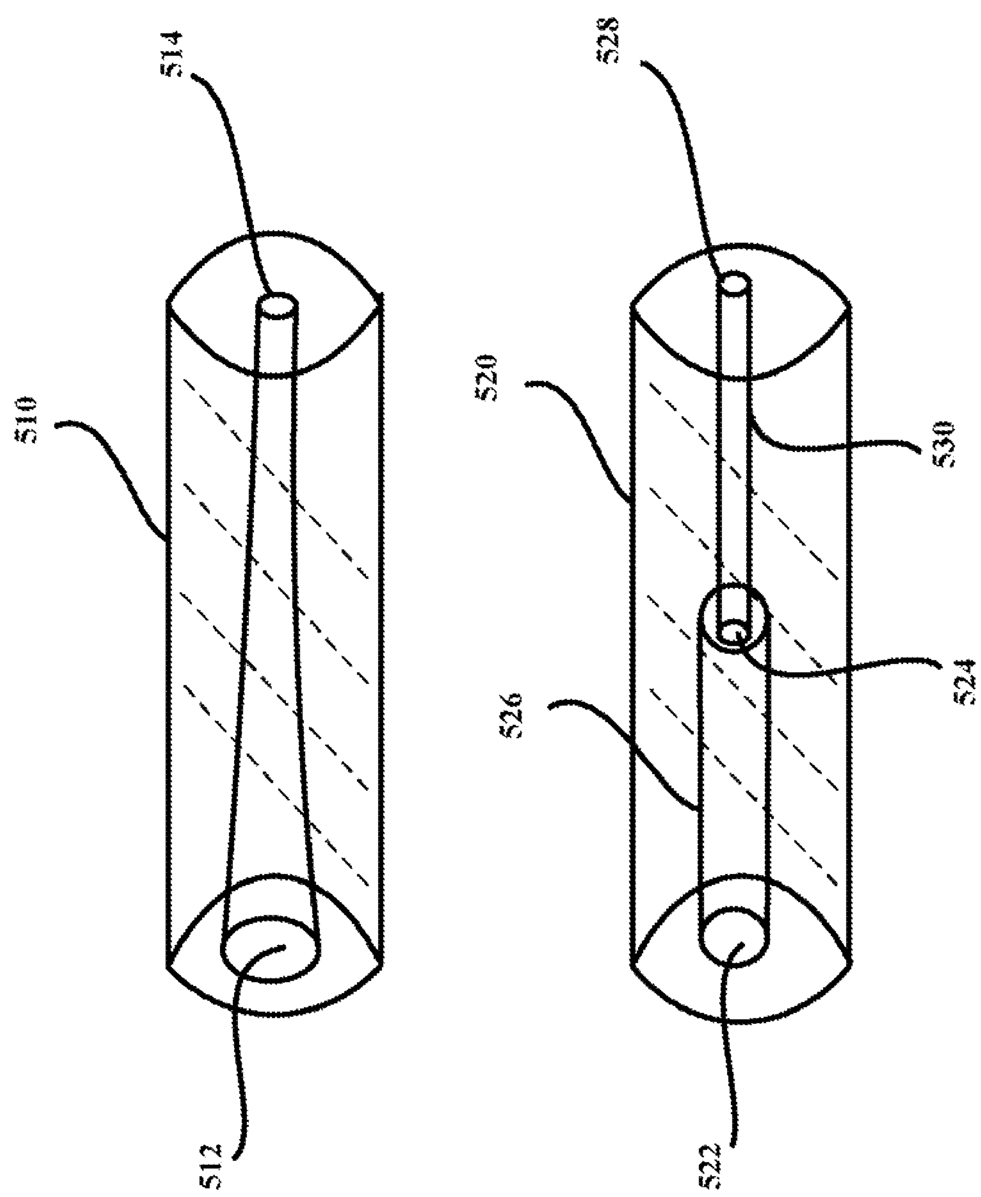
FIG. 5B shows, in accordance with an embodiment of the invention, a simplified schematic of variations on hole diameter tapering through a collimator.

FIG. 5B shows, in accordance with an embodiment of the invention, a simplified schematic of variations on hole diameter tapering through a collimator. Traditionally, a hole is bored straight through a collimator to produce a hole with same diameter through both ends and/or through the length of the collimator. However, the hole may be tapered to have any arbitrary function, i.e. continuous and/or non-continuous function, to minimise the angle of acceptance for a particular optical path.

As shown in FIG. 5B, a collimator 510 is configured to have at one end a first hole 512 of a first diameter and a second hole 514 of a second diameter at the other end. In an embodiment, the diameter of first hole 512 may be larger than the diameter of second hole 514. In an embodiment, first hole 512 and second hole 514 are connected by a linear decreasing continuous function, i.e., a straight tapering.

In another embodiment, a collimator 520 is configured to have on one end a first hole 522 of a first diameter being bored straight through collimator 520 to an arbitrary depth 524. On another end of collimator 520, a second hole 528 of a second diameter may be bored straight through collimator 520 to the same arbitrary depth 524. In an embodiment, collimator 520 may have holes with different diameter, e.g., first hole 522 and second hole 528. Each hole may have an arbitrary non-continuous function, e.g. first arbitrary function 526 and/or second arbitrary function 530, in an embodiment.

With the flexibility of being able to vary diameter of a hole through a collimator, a collimator may be designed with holes optimized to collect light from optical path through a line of sight with a minimal acceptance angle. A high aspect ratio collimator assembly reduces line-of-sight light acceptance to some arbitrary angle, theta, based on aspect ratio. However, additional light, at incidence angles both smaller or larger than theta may be guided through collimator holes due to reflection off of the interior hole surface. This additional source of off-axis light increases noise levels and requires minimization. Methods such as using low albedo materials or using tapered diameter collimator holes are two of many methods which perform this functionality. As the term is employed herein, low albedo materials are materials that may have low ratio of light reflecting off the surface.

Figure 6A:
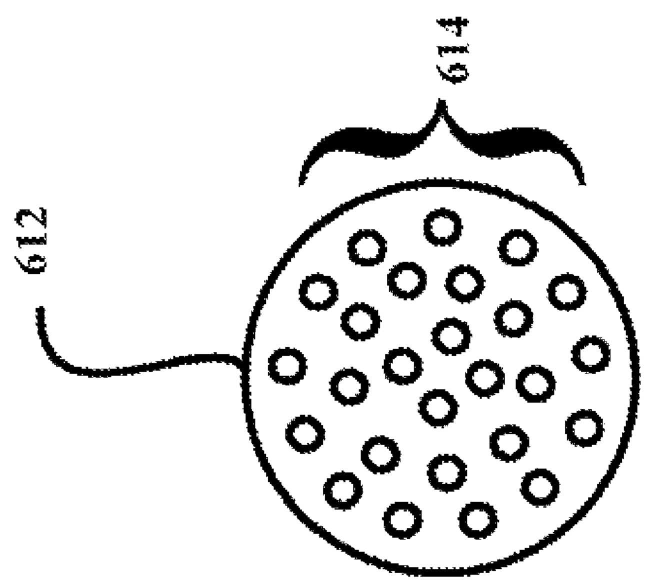
FIG. 6A shows, in accordance with an embodiment of the invention; a simplified schematic of variations on hole placement on a collimator.
Figure 6A:
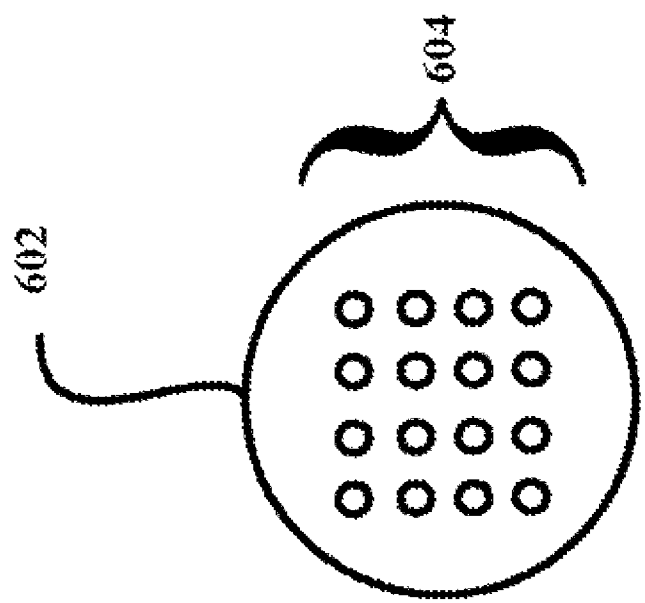

FIG. 6A shows, in accordance with an embodiment of the invention, a simplified schematic of variations on hole placement on a collimator. In an embodiment, a collimator end 602 may be configured with an array of holes 604 being arranged in a simple linear rows, e.g., the rows are one on top of another. In another embodiment, a collimator end 612 may be configured with an array of holes 614 being arranged in concentric circles. In general, other arrangements may also be employed for placement of holes on a collimator.

Figure 6B:
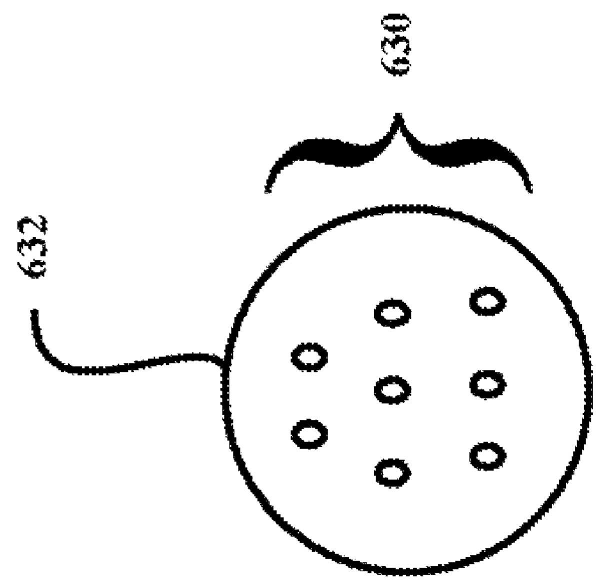
FIG. 6B shows, in accordance with an embodiment of the invention, a simplified schematic of variations on hole density on a collimator.
Figure 6B:
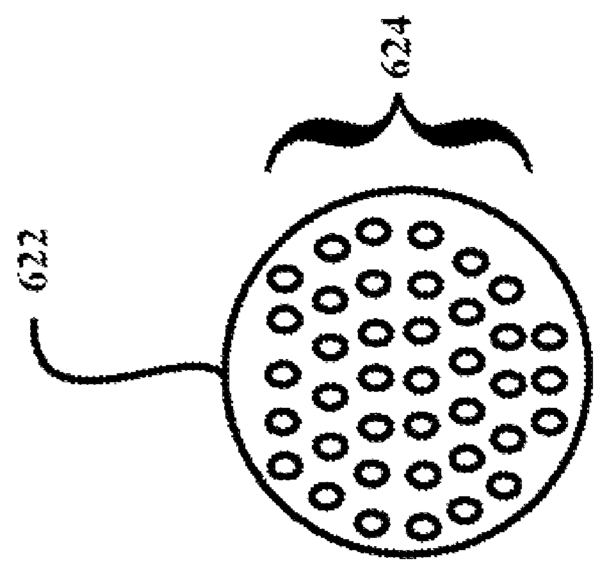

FIG. 6B shows, in accordance with an embodiment of the invention, a simplified schematic of variations on hole density on a collimator. In an embodiment, a collimator end 622 may be configured with an array of holes 624 being configured with high hole density. In an example, the density of the holes relative to the area of collimator end 622 for high hole density may be up to about 65% to about 70%. In another embodiment, a collimator end 632 may be configured with an array of holes 634 being configured with a sparse hole density. In an example, the density of the holes relative to the area of collimator end 632 may be about 10% to about 15%. In general, density of the holes relative to an area of a collimator end may be about 5% to about 95%.

Figure 6C:
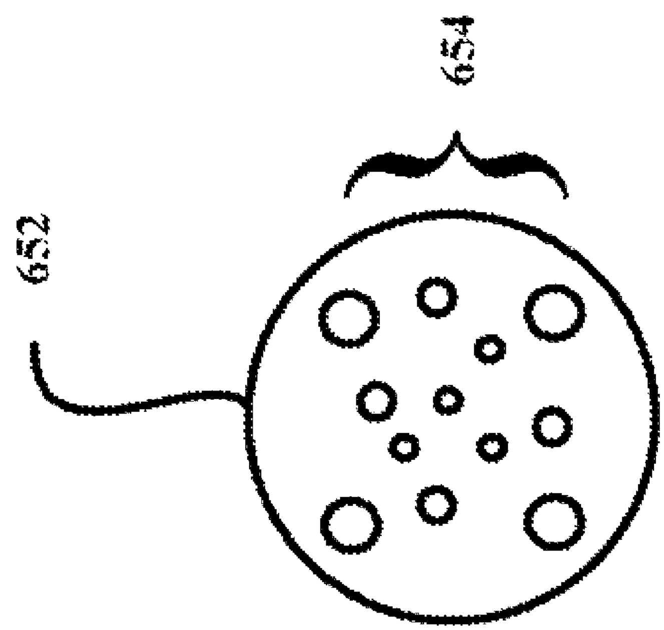
FIG. 6C shows, in accordance with an embodiment of the invention, a simplified schematic of variations on a distribution of hole diameters on a collimator.
Figure 6C:
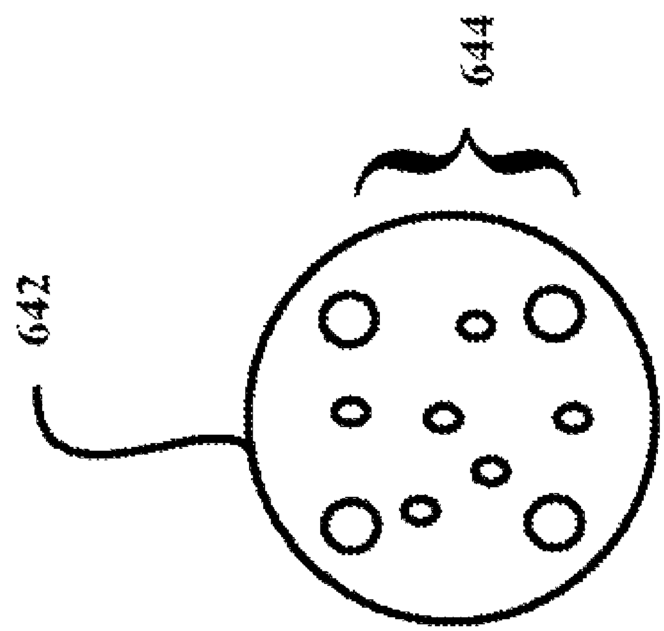

FIG. 6C shows, in accordance with an embodiment of the invention, a simplified schematic of variations on a distribution of hole diameters on a collimator. In an embodiment, a collimator end 642 may be configured with an array of holes 624 being configured with a bimodal distribution, i.e., a distribution of holes of two different diameters. In another embodiment, a collimator end 652 may be configured with an array of holes 654 being configured with a trimodal distribution, i.e., a distribution of holes of three different diameters. In general, the hole diameter distribution may be any arbitrary distribution to optimize for percent of hole area coverage or any other factor desired.

Thus, in a collimator arrangement, each collimator may independently be optimized for hole diameter, hole length, hole shape, hole tapering function, hole placement, hole density, and/or hole diameter distribution. The various permutations for each feature may allow for a plurality of methods to optimize a collimator arrangement to attain the same light collection efficiency.

As may be appreciated from the foregoing, embodiments of the invention provide methods and arrangements for a moderately sized collimator arrangement manufacturable with traditional machining capability. By machining each collimator to the highest aspect ratio achievable with traditional machining technology, cost savings may be realized while maintaining control of the low acceptance angle for line of sight. Furthermore, collimator arrangement with high effective aspect ratio may better prevent spectral signal drift by providing effective separation of viewport from plasma species. Thus, the proposed collimator assembly significantly increases MTBF (mean time between failures) for optical components with direct plasma exposure and reduces overall system costs and downtime.

While this invention has been described in terms of several preferred embodiments, there are alterations, permutations, and equivalents, which fail within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fail within the true spirit and scope of the present invention.

What is claimed is:

1. A method for optical interrogation of plasma during plasma processing, said plasma processing being performed using a plasma processing chamber, said method comprising:

providing a collimator arrangement inside said plasma processing chamber, said collimator arrangement including at least a first collimator, a second collimator separated from said first collimator, and a movement mechanism coupled with said second collimator;

coupling said collimator arrangement to an optical viewport, said optical viewport being coupled to said plasma processing chamber;

moving, using said movement mechanism, said second collimator relative to said first collimator; and collecting optical signals, through said collimator arrangement, from said plasma within said plasma processing chamber while a substrate is being processed.

2. The method of claim 1 wherein said optical viewport is optically transparent to a predetermined range of wavelengths.

3. The method of claim 2 wherein said predetermined range of wavelengths is from infrared (IR) wavelengths to ultraviolet (UV) wavelengths.

4. The method of claim 1 further comprising fabricating said collimator arrangement from a monolithic unit.

5. The method of claim 1 further comprising fabricating said collimator arrangement from multiple components.

6. The method of claim 1 further comprising machining said first collimator and said second collimator independently.

7. The method of claim 1 further comprising:

disposing a housing inside said plasma processing chamber;

using a connecting member to create a void area between said first collimator and said collimator, a first end of said connecting member being attached to an edge of said first collimator, a second end of said connecting member being attached to an edge of said second collimator; and disposing said first collimator, said second collimator, and said connecting member inside said housing.

8. The method of claim 1 further comprising using at least one keying feature to align said first collimator with said second collimator.

9. The method of claim 1 further comprising using at least one keying feature to separate said first collimator from said second collimator.

10. The method of claim 1 further comprising:

inserting said first collimator into a housing; and using a keying feature to set an insertion depth for the inserting.

11. The method of claim 1 further comprising using said movement mechanism to align said second collimator with said first collimator.

12. The method of claim 1 further comprising linearly translating, using said movement mechanism, said second collimator relative to said first collimator.

13. The method of claim 1 further comprising rotating, using said movement mechanism, said second collimator relative to said first collimator.

14. The method of claim 1 further comprising tilting, using said movement mechanism, said second collimator relative to said first collimator.

15. The method of claim 1 further comprising providing at least a hole formed from a first end of a holed collimator to a second end of said holed collimator, said holed collimator being one of said first collimator and said second collimator, the shape of a cross section of said hole being a polygon.

16. The method of claim 1 further comprising providing at least a hole formed from a first end of a holed collimator to a second end of said holed collimator, said holed collimator being one of said first collimator and said second collimator, said hole having a tapered structure configured according to a predetermined tapering function.

17. The method of claim 16 wherein said predetermined tapering function is a continuous function.

18. The method of claim 16 wherein said predetermined tapering function is a non-continuous function.

19. The method of claim 1 further comprising providing at least a hole formed from a first end of a holed collimator to a second end of said holed collimator, said holed collimator being one of said first collimator and said second collimator, said hole including a first portion and a second portion, the diameter of a cross section of said first portion being, different from the diameter of a cross section of said second portion.

20. The method of claim 1 further comprising:

providing a first set of holes formed from a first end of a holed collimator to a second end of said holed collimator, said holed collimator being one of said first collimator and said second collimator, the cross section of each hole of said first set of holes being of a first size; and providing a second set of holes is formed from said first end of a holed collimator to said second end of said holed collimator, the cross section of each hole of said second set of holes being of a second size that is different from said first size.

21. A diagnostic tool for performing optical interrogation of plasma during plasma processing, said diagnostic tool being configured for use inside a plasma processing chamber, said diagnostic tool comprising:

a first collimator;

a second collimator; and a movement mechanism coupled with said second collimator for moving said second collimator relative to said first collimator.

22. The diagnostic tool of claim 21 wherein said movement mechanism is configured for at least linearly translating said second collimator relative to said first collimator.

23. The diagnostic tool of claim 21 wherein said movement mechanism is configured for at least rotating said second collimator relative to said first collimator.

24. The diagnostic tool of claim 21 wherein said movement mechanism is configured for at least tilting said second collimator relative to said first collimator.

25. The diagnostic tool of claim 21 further comprising:

a connecting member creating a void area between said first collimator and said collimator, a first end of said connecting member being attached to an edge of said first collimator, a second end of said connecting member being attached to an edge of said second collimator; and a housing, wherein said first collimator, said second collimator, and said connecting member are disposed inside said housing.

26. The diagnostic tool of claim 21 wherein a hole is formed from a first end of a holed collimator to a second end of said holed collimator, said holed collimator being one of said first collimator and said second collimator, the shape of a cross section of said hole being a polygon.

27. The diagnostic tool of claim 21 wherein a hole is formed from a first end of a holed collimator to a second end of said holed collimator, said holed collimator being one of said first collimator and said second collimator, the shape of a cross section of said hole being a triangle.

28. The diagnostic tool of claim 21 wherein a hole is formed from a first end of a holed collimator to a second end of said holed collimator, said holed collimator being one of said first collimator and said second collimator, a first end of said hole being located at said first end of said holed collimator, a second end of said hole being located at said second end of said holed collimator, the diameter of said first end of said hole being different from the diameter of said second end of said hole.

29. The diagnostic tool of claim 21 wherein a hole is formed from a first end of a holed collimator to a second end of said holed collimator, said holed collimator being one of said first collimator and said second collimator, said hole including a first portion and a second portion, the diameter of a cross section of said first portion being different from the diameter of a cross section of said second portion.

30. The diagnostic tool of claim 21 wherein a hole is formed from a first end of a holed collimator to a second end of said holed collimator, said holed collimator being one of said first collimator and said second collimator, said hole having a tapered structure.

31. The diagnostic tool of claim 21 wherein a first set of holes is formed from a first end of a holed collimator to a second end of said holed collimator, said holed collimator being one of said first collimator and said second collimator, the cross section of each hole of said first set of holes being of a first site, and a second set of holes is formed from said first end of a holed collimator to said second end of said holed collimator, the cross section of each hole of said second set of holes being of a second size that is different from said first size.

32. The diagnostic tool of claim 31 wherein a third set of holes is formed from said first end of a holed collimator to said second end of said holed collimator, the cross section of each hole of said third set of holes being of a third size that is different from said first size and is different from said second size.

33. A method for optical interrogation of plasma during plasma processing, said plasma processing being performed using a plasma processing chamber, said method comprising:

providing an optical viewport;

providing a collimator arrangement inside said plasma processing chamber, said collimator arrangement being coupled to said optical viewport, said collimator arrangement being configured with a first collimator on a first end and a second collimator on a second end, said first collimator and said second collimator being separated by a void area said collimator arrangement including a movement mechanism coupled with said second collimator;

moving, using said movement mechanism, said second collimator relative to said first collimator; and collecting optical signals from said plasma within said plasma processing chamber while a substrate is being processed.

34. A method for reducing deposition on an optical viewport during plasma processing, said plasma processing being performed using a plasma processing chamber, said method comprising:

coupling a collimator arrangement to said optical viewport, said collimator arrangement being disposed inside said plasma processing chamber, said collimator arrangement including at least a first collimator, a second collimator separated from said first collimator, and a movement mechanism coupled with said second collimator;

moving, using said movement mechanism, said second collimator relative to said first collimator; and collecting optical signals, through said collimator arrangement, from said plasma within said plasma processing chamber while a substrate is being processed.

35. A method for reducing etching of an optical viewport during plasma processing, said plasma processing being performed using a plasma processing chamber, said method comprising:

providing a collimator arrangement inside said plasma processing chamber;

coupling said collimator arrangement to said optical viewport, said collimator arrangement including at least a first collimator, second collimator, a movement mechanism coupled with said second collimator, and a connecting member creating, a void area between said first collimator and said second collimator, a first end of said connecting member being attached to an edge of said first collimator, a second end of said connecting member being attached to an edge of said second collimator;

moving, using said movement mechanism, said second collimator relative to said first collimator; and collecting optical signals, through said collimator arrangement, from said plasma within said plasma processing chamber while a substrate is being processed.

* * * * *